United States Patent
Park

(10) Patent No.: US 7,898,563 B2
(45) Date of Patent: Mar. 1, 2011

(54) USER INPUT METHOD AND DEVICE OF MOBILE COMMUNICATION TERMINAL

(75) Inventor: Ki-Dong Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1180 days.

(21) Appl. No.: 11/501,136

(22) Filed: Aug. 8, 2006

(65) Prior Publication Data

US 2007/0064091 A1 Mar. 22, 2007

(30) Foreign Application Priority Data

Aug. 11, 2005 (KR) ................ 10-2005-0073797

(51) Int. Cl.
*H04N 7/14* (2006.01)

(52) U.S. Cl. .............. 348/14.01; 348/14.03; 348/14.02; 382/100

(58) Field of Classification Search ... 348/14.01–14.16, 348/77; 345/156, 173, 420; 382/103, 100, 382/189, 290, 107; 715/863
See application file for complete search history.

(56) References Cited

U.S. PATENT DOCUMENTS

| | | | |
|---|---|---|---|
| 5,615,285 A * | 3/1997 | Beernink | 382/189 |
| 6,160,899 A * | 12/2000 | Lee et al. | 382/103 |
| 6,222,465 B1 * | 4/2001 | Kumar et al. | 341/20 |
| 7,692,627 B2 * | 4/2010 | Wilson | 345/156 |
| 2002/0140667 A1 | 10/2002 | Horiki | |
| 2002/0196343 A1 | 12/2002 | Navab et al. | |
| 2003/0179218 A1 | 9/2003 | Martins et al. | |
| 2004/0113885 A1 | 6/2004 | Genc et al. | |

FOREIGN PATENT DOCUMENTS

| | | |
|---|---|---|
| JP | 2002-290529 | 10/2002 |
| KR | 10-2005-0078136 | 8/2005 |
| RU | 2 227 930 | 4/2004 |
| WO | WO 99/07153 | 2/1999 |

\* cited by examiner

*Primary Examiner*—Melur Ramakrishnaiah
(74) *Attorney, Agent, or Firm*—The Farrell Law Firm, LLP

(57) ABSTRACT

A user input method and device of a mobile communication terminal that includes displaying a menu screen comprising images associated with each key function and menu function necessary for terminal control, depending on a currently set operation mode; detecting a preset indicator from a video that is photographed by camera when augmented reality input mode is set, real-time synthesizing the detected indicator with the menu screen, and displaying the synthesized screen; and in a state where a predetermined one of the images and the indicator are overlapped on the synthesized screen, upon detection of a preset user motion associated with selection from the video photographed by the camera, performing an operation based on the function associated with the image.

19 Claims, 6 Drawing Sheets

USER INPUT METHOD AND DEVICE OF MOBILE COMMUNICATION TERMINAL

PRIORITY

This application claims priority under 35 U.S.C. §119 to an application entitled "User Input Method and Device of Mobile Communication Terminal" filed in the Korean Intellectual Property Office on Aug. 11, 2005 and assigned Serial No. 2005-73797, the contents of which are incorporated herein by reference.

BACKGROUND OF THE INVENTION

1. Field of the Invention

The present invention relates generally to a mobile communication terminal, and in particular, to a method and device for user input such as key input in a mobile communication terminal.

2. Description of the Related Art

A mobile communication terminal provides various additional services beyond basic call service. For example, these additional services include, but are not limited to, a short message service, a multimedia message service, a game service for game play, and a wireless Internet service.

The increasing number of additional services provided through the mobile communication terminal results in changes to a user interface. At the early stages of the mobile communication technology, a key input unit constituted only numeric keys in which a plurality of alphabetic characters were assigned to each numeric key of 0 to 9 and basic function keys for call and end call. However, a current key input unit can include a plurality of alphabetic characters assigned to one numeric key, thereby increasing its complexity. Similarly, the complexity of a function key such as a direction key has increased in kind, thereby increasing both the total number of key buttons of the key input unit, and functions provided to each function key. In the mobile communication terminal, the key buttons are essential constituent elements for allowing a user to control an operation of the mobile communication terminal. However, each button is not used in each of the various operation modes or in a predetermined operation control. Despite the fact that depending on an operation mode currently set to the mobile communication terminal or the operation in execution, only a few related key buttons are utilized. A large number of provided key buttons tend to inconvenience the user and cause inefficiency.

The size of the mobile communication terminal is increasingly shrinking as are the key buttons. The decreasing size of the key buttons is inconvenient for the user, and further requires more delicate manipulation. The size of a display screen of the mobile terminal has increased as has the information provided to the user. However, the minimally guaranteed area of the key input unit limits the size by which the display screen can increase. This causes further user dissatisfaction.

Augmented reality (AR) is a user interface technology for matching a virtual video generated by a computer with a real video viewed by a user. AR is a technology for real-time synthesizing of virtual additional information, such as a character and a graphic, generated by the computer with the real video viewed by the user, and displaying the synthesized result in order to greater enhance a real sense and a recognition degree. An AR system's real time matches the real video obtained through a camera with the computer generated virtual video, tracks a positioning of the camera using tracker, error corrects the tracker and the camera, and it simulates the matched result in two or three dimensions. AR is utilized in various fields including, but not limited to, game, broadcasting, education, medicine, design, and advertisement.

As described above, AR can detect user's motion so long as a camera, a display unit, and a processor for video data processing.

Accordingly, a user input method of the mobile communication terminal having the AR feature will be embodied with more convenience.

SUMMARY OF THE INVENTION

It is, therefore, an object of the present invention to provide a convenient user input method and device of a mobile communication terminal.

It is another object of the present invention to provide a user input method and device of a mobile communication terminal using augmented reality (AR).

Accordingly, to achieve the above and other objects of the present invention, there is provided a user input method of a mobile communication terminal. The method includes displaying a menu screen having images associated with each key function and menu function necessary for terminal control, depending on a currently set operation mode; detecting a preset indicator from a real video photographed by camera when AR input mode is set, real-time synthesizing the detected preset indicator with the menu screen, and displaying the synthesized screen; and in a state where one of a predetermined image and the preset indicator are overlapped on the synthesized screen, upon detection of a preset user motion associated with selection from the video photographed by the camera, performing an operation based on the function associated with the predetermined image.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
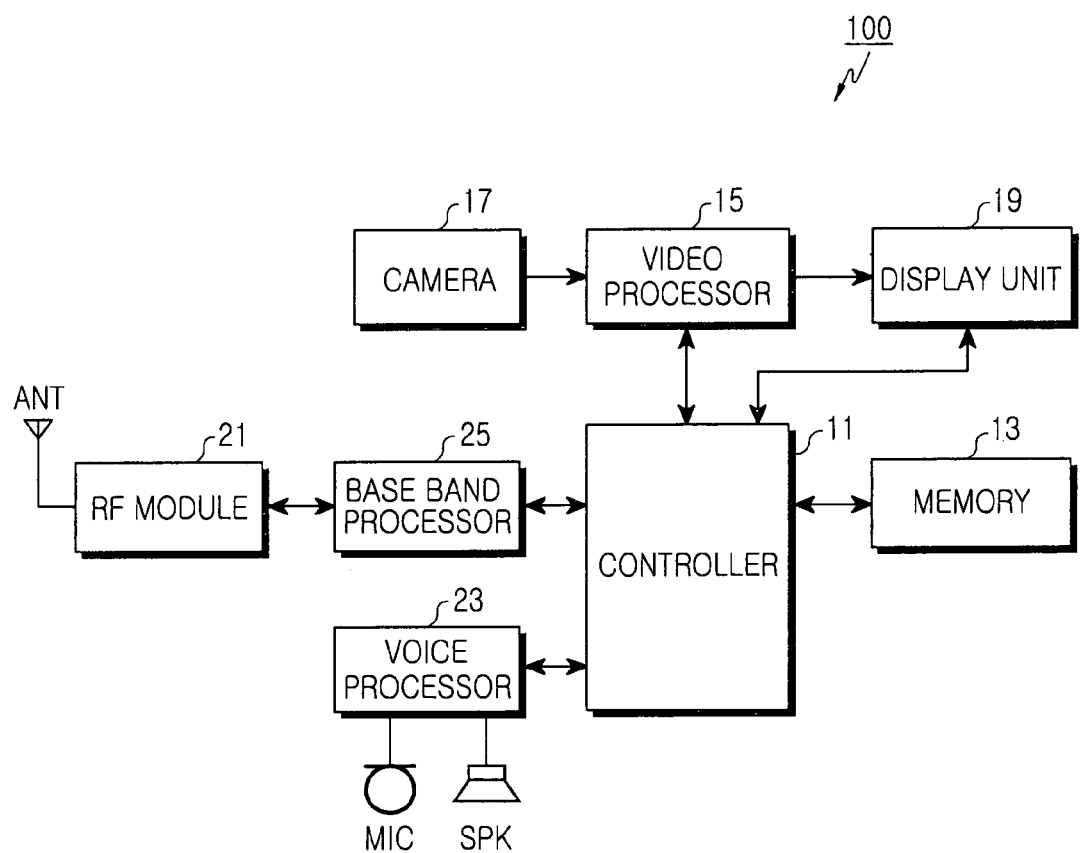
FIG. 1 is a block diagram schematically illustrating a mobile communication terminal according to the present invention.

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

FIG. 1 is a block diagram schematically illustrating a mobile communication terminal according to the present invention. As shown in FIG. 1, the inventive mobile communication terminal 100 includes a controller 11, a memory 13, a video processor 15, a camera 17, a display unit 19, a base band processor 25, a radio frequency (RF) module 21, and a voice processor 23.

The controller 11 controls a general operation of the mobile communication terminal 100. The RF module 21 transmits and receives a wireless signal with a mobile communication base station through an antenna. The RF module 21 modulates a signal received from the controller 11 through the base band processor 25, and transmits an wireless signal, such as an RF signal, through the antenna. The RF module 21 demodulates the RF wireless signal received through the antenna, and transmits the demodulated RF wireless signal to the controller 11 through the base band processor 25. The base band processor 25 processes a base band signal transmitted and received between the RF module 21 and the controller 11.

The voice processor 23 connected with the controller 11, together with a microphone (MIC) and a speaker (SPK) connected to the voice processor 23 are used for telephone call and voice record.

The display unit 19 displays a variety of image information including an image received from the base station or stored in the memory 13, on a display screen under the control of the controller 11.

The camera 17 outputs an image frame obtained by an image sensor (not shown), to the video processor 15. Under the control of the controller 11, the video processor 15 converts the image frame received from the camera 17, into video data, and outputs the converted image frame to the display unit 19. Under the control of the controller 11, the video processor 15 real-time matches a real video obtained using the camera 17 with a virtual video stored in the memory 13, or real-time matches a preset indicator detected from the real video with the virtual video, corrects an error, and displays the matched result of the real video and the virtual video on the display unit 19 in two or three dimensions.

The memory 13 stores a program for a process and control of the controller 11, reference data, and a variety of updateable storage data. The memory 13 is provided as a working memory of the controller 11. According to the present invention, the memory 13 stores program data for executing augmented reality (AR) input mode, and stores a variety of images necessary for an operation control of the mobile communication terminal 100. The AR input mode refers to a mode in which the preset indicator is detected from the real video photographed using the camera 17. In the AR input mode, the detected preset indicator is synthesized with a predetermined virtual video constituted of images previously stored in the memory 13, the synthesized video is displayed, and, in such a displayed state, when the preset indicator indicates input for selecting the image included in the predetermined virtual video or indicates direct data input using the indicator, an operation of the mobile communication terminal based on the indicated input is executed. The variety of images necessary for operation control include images associated with key, a variety of menus and various background screens.

The memory 13 stores a variety of indicator information and a variety of user motions that are necessary for execution of the AR input mode according to the present invention. The indicator information refers to information necessary for distinguishing the indicator recognized as an input element of the mobile communication terminal 100, from a video photographed by the camera 17 in the execution of the AR input mode. For example, the indicator can be in the form of a user's finger, pen, infrared-ray output pen, pupil, and face. The indicator information is information for distinguishing and recognizing the indicators. In the present invention, a user can designate one of the indicators stored in the memory 13, and can register a new indicator. The additional registration of the new indicator is to store the indicator information in the memory 13, and the storing of the indicator information is to photograph the indicator.

The user's motion refers to user's predefined motions associated with a variety of commands that the user can input to the mobile communication terminal 100 in the AR input mode. The variety of commands can be a select, an unselect, as well as a start and end of a predetermined motion. The user's motions associated with the variety of commands can be all distinguished differently, or can be constituted of the same motion according to need. For example, when the indicator has a finger or pen shape, user's motions associated with the select and the unselect commands, can be defined as a press motion. A user's motions associated with the start and the end commands, can be defined as a circling motion. For another example, when the indicator is the pupil, the select motion and the unselect motion can be defined as a motion of blinking eyes once, and the start motion and the end motion can be also defined as a motion of blinking the eyes twice.

According to the present invention, the memory 13 stores data necessary for reading character, and stores program data relating to a virtual action menu, and a plurality of virtual action codes. The virtual action menu refers to a menu for synthesizing a predetermined fixed virtual image or dynamic virtual image with a real video and displaying the synthesized video on a video call screen of a mobile communication terminal of the other called party. Each menu includes the virtual action code. The virtual image can be pollen or a firecracker.

An operation of the mobile communication terminal 100 according to the present invention is as follows. In the mobile communication terminal 100, the controller 11 displays a menu screen that includes key interfaces or menus having images associated with a variety of keys depending on operation mode. Upon the execution of the AR input mode, the controller 11 real-time synthesizes the indicator detected from the photographed video, with the menu screen, and displays the synthesized screen on the display unit 19. In order to select, the user then checks the display unit 19, and positions the indicator on an image associated with a key or menu. Next, the user performs a motion for selecting the image, that is, the select motion, the controller 11 detects the consistency of a position of the indicator and a position of the image, detects the select motion, detects the selection of the key or menu associated with the selected image, and performs an operation based thereon. In the present invention, the consistency of the position of the indicator and the position of the image means that there exists an overlap portion of two images. This does not mean that center coordinates of the two images are not consistent with each other.

Figure 2:
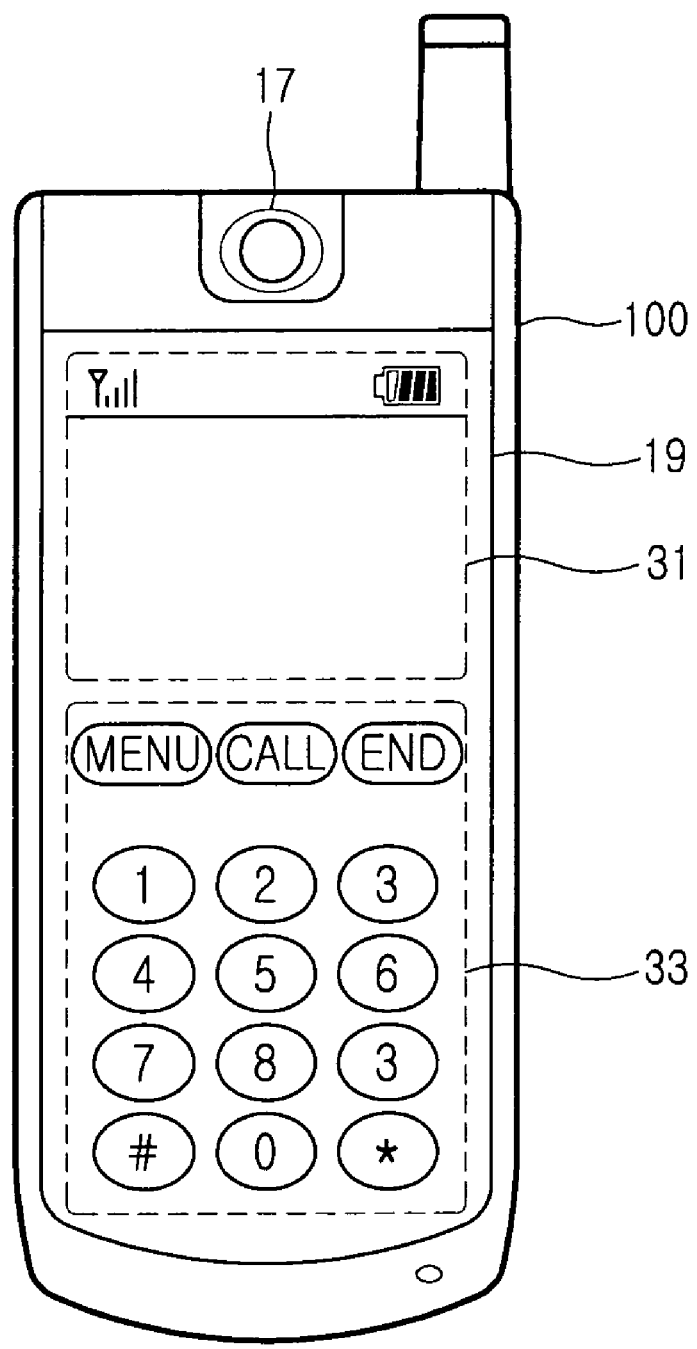
FIG. 2 is a front view illustrating a mobile communication terminal according to the present invention.

According to the present invention, the mobile communication terminal 100 displays a variety of keys necessary for its operation control on the display unit 19, executes the AR input mode in response to user's request, receives key input using an AR function, and receives the menu select. Thus, it may not include a separate key input unit. Accordingly, the mobile communication terminal 100 can be configured as in FIG. 2. FIG. 2 is a front view illustrating the mobile communication terminal according to the present invention.

As shown in FIG. 2, the mobile communication terminal 100 includes the display unit 19 in its frontal view, and the camera 17 at its top portion. The display unit 19 can be divided as a normal display screen 31 for displaying information of the mobile communication terminal and an input display screen 33 for displaying the key or the variety of menus depending on current operation mode. The normal display screen 31 and the input display screen 33 being divided as in FIG. 2, only the input display screen 33 is synthesized with the indicator.

In FIG. 2, a entire display unit 19 can be constructed by the input display screen 33 depending on the operation mode, however the normal display screen 31 and the input display screen 33 are shown as divided.

In the AR input mode, the mobile communication terminal 100 can receive all user's inputs using a key input unit of a conventional mobile communication terminal. Several preferred embodiments based thereon will be described with reference to FIGS. 3 to 6 below.

Figure 3:
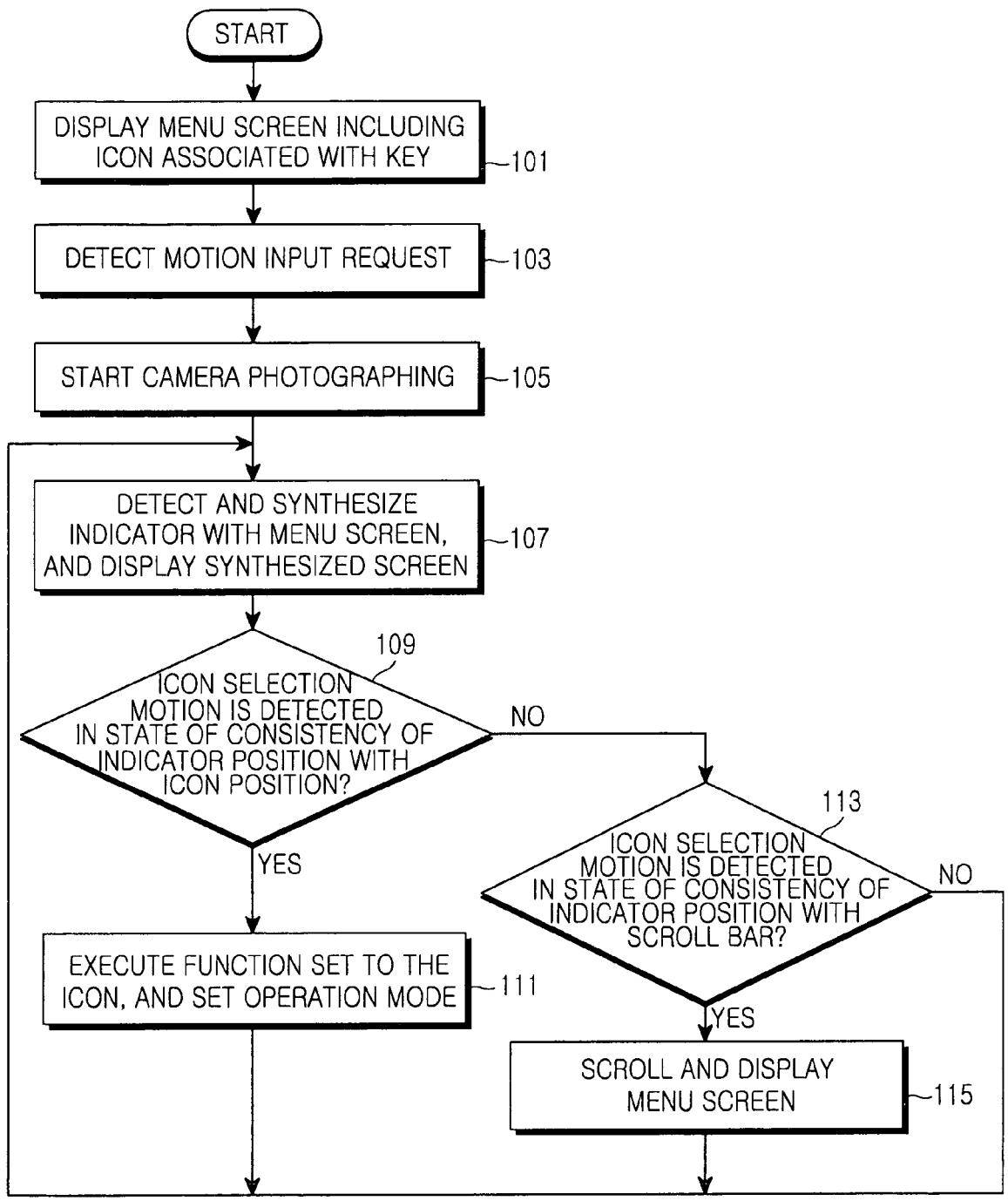
FIG. 3 is a flowchart schematically illustrating an operation of a controller based on menu select process in a mobile communication terminal according to the present invention.

A key input process according to the present invention will be described with reference to FIG. 3. FIG. 3 is a flowchart schematically illustrating an operation of the controller based on menu select process in the mobile communication terminal according to the present invention. As shown in FIG. 3, in Step 101, the controller 11 displays the menu screen including the image or icon associated with the key necessary for terminal control depending on the currently set operation mode. For example, in current standby mode, the controller 11 displays a basic function key that includes send key, menu key, cancel key, and okay key, and a numeric key. After that, upon the detection of motion input request in Step 103, the controller 11 proceeds with Step 105. The motion input request refers to a request for setting the AR input mode. This request can be performed by separate key input. The controller 11 starts camera photographing in Step 105, and proceeds with Step 107. In the Step 107, the controller 11 detects the previously designated indicator from the photographed video, real-time synthesizes the detected indicator with the menu screen, and displays the synthesized screen. For example, if the previously designated indicator is the finger, the controller 11 detects a finger image as the indicator, from user's images photographed by the camera, and synthesizes a real-time motion of the finger with the menu screen. The user detects a finger position, viewing the synthesized screen, and moving the finger by a key icon to select. In Step 109, the controller 11 analyzes the photographed video, and checks whether an icon selection user's motion is detected in a state where the position of the indicator is consistent with a position of a predetermined icon of the menu screen. Upon the detection, Step 111 is performed, and otherwise, Step 113 is performed. In other words, in a state where the user positions the finger on a predetermined key icon, when the user performs the press motion that is the user's motion associated with preset selection, in the Step 111, the controller 11 executes a function that is set to the icon, sets an operation mode depending on the result, proceeds with Step 107, and performs the Steps 109 to 115.

In the Step 113, the controller 11 analyzes the photographed video and the menu screen, and checks whether the icon selection user's motion is detected in a state where the position of the indicator is consistent with a scroll bar of the menu screen. Upon the detection of the icon selection user's motion, the controller 11 performs Step 115, and performs the Step 109.Simply, in a state where the user moves the finger to a position on the scroll bar of the menu screen and makes the position of the scroll bar consistent with the position of the finger, by performing the press motion that is the preset selection user's motion, the controller 11 detects the selection of the scroll bar, scrolls and displays the menu screen depending on a motion of the indicator in the Step 115, and proceeds with the Step 109.

The process of selecting and inputting the key is described above in the present invention. A process of selecting the menu is also performed in similar manner. In other words, in a state where the controller 11 displays the screen including a variety of menu lists, when setting the AR input mode, the controller 11 detects the indicator from the photographed video, real-time synthesizes the detected indicator with the displayed screen, and displays the synthesized screen. The user positioning the indicator on a desired menu list, and taking the selection user motion, the controller 11 determines that a menu of the same position as a current position of the indicator is selected, and performs an operation based on the selected menu. The menu list may be displayed in various formats. It may also be displayed as an icon or dynamic image associated with each menu.

Figure 4:
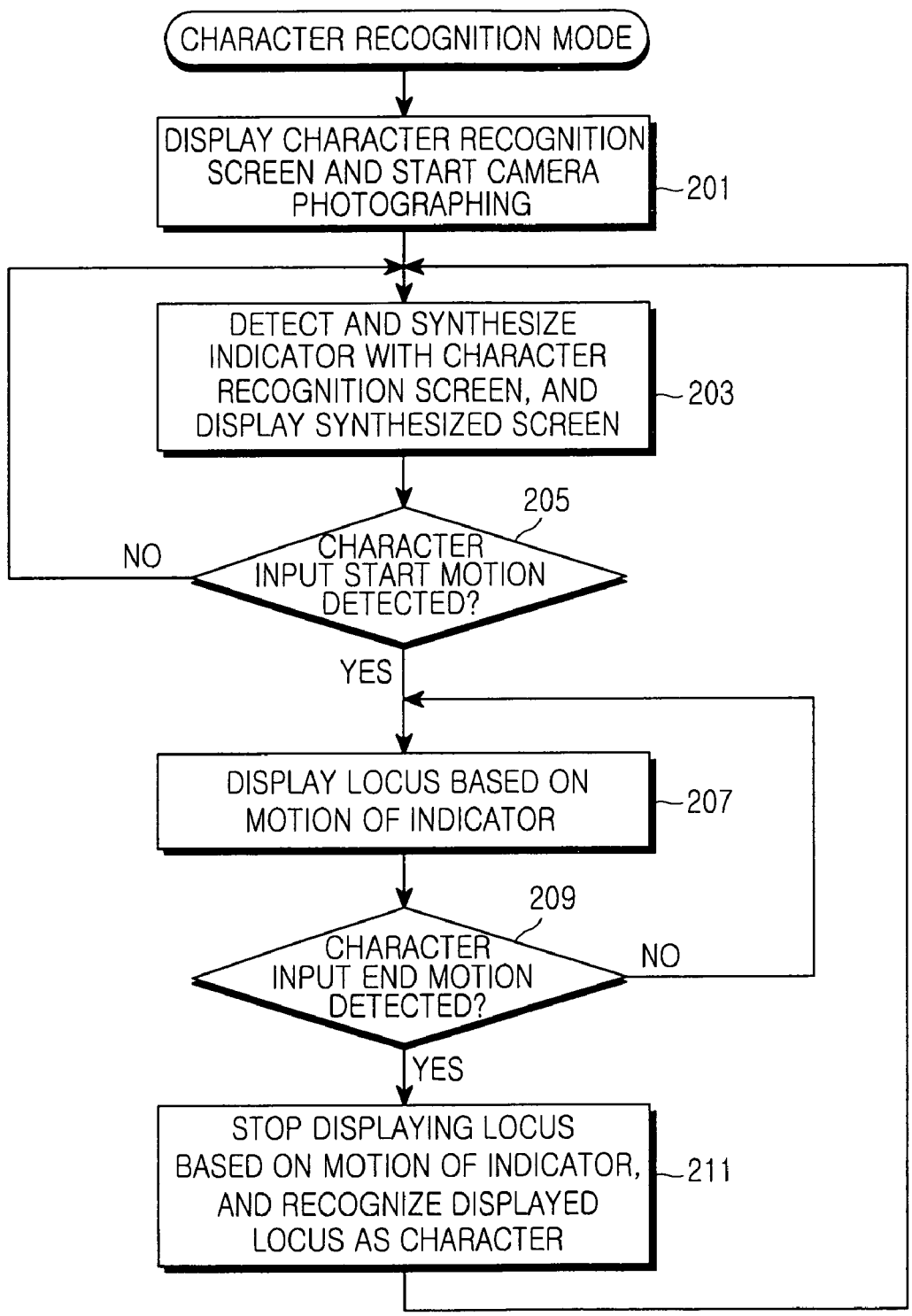
FIG. 4 is a flowchart schematically illustrating an operation of a controller based on character recognition process according to the present invention.

In the present invention, a process of inputting the character, using the motion of the indicator, in the AR input mode will be described with reference to FIG. 4. FIG. 4 is a flowchart schematically illustrating an operation of the controller 11 based on character recognition process according to the present invention. Referring to FIG. 4, upon setting of character recognition mode, the controller 11 displays a character recognition screen and starts the camera photographing in Step 201. In the present invention, the character recognition mode refers to a mode for recognizing a character in association with the motion of the indicator based on the AR input mode. In Step 203, the controller 11 detects the indicator from the photographed video, synthesizes the detected indicator with the character recognition screen, displays the synthesized screen, and proceeds with Step 205. The indicator being displayed as synthesized with the character recognition screen, the user takes a preset input start user motion to write the character in a suitable position, and then writes the character. In Step 205, the controller 11 checks whether the character input, start user's motion, is detected from the photographed video. Upon the detection of the character input start user's motion, the controller 11 performs Step 207. In the Step 207, the controller 11 displays a locus based on the motion of the indicator, and proceeds with Step 209. Upon the completion of writing of the desired character, the user takes a preset input end user motion. In other words, the user desiring to write "3" takes the input start user's motion and writes the "3." Upon the completion of writing of the "3," the user takes the input end user's motion. Upon the detection of the character input end user's motion from the photographed video in the Step 209, the controller 11 proceeds with Step 211. In the Step 211, the controller 11 stops displaying the locus based on the motion of the indicator, recognizes the displayed locus as the character, proceeds with the Step 203, and repeatedly performs the Steps 203 to 211. In the above example, when the indicator is the infrared-ray pen, the input start user's motion and end user's motion can also be the existence and absence of infrared-ray light.

In the above process, the user can input the character.

Figure 5:
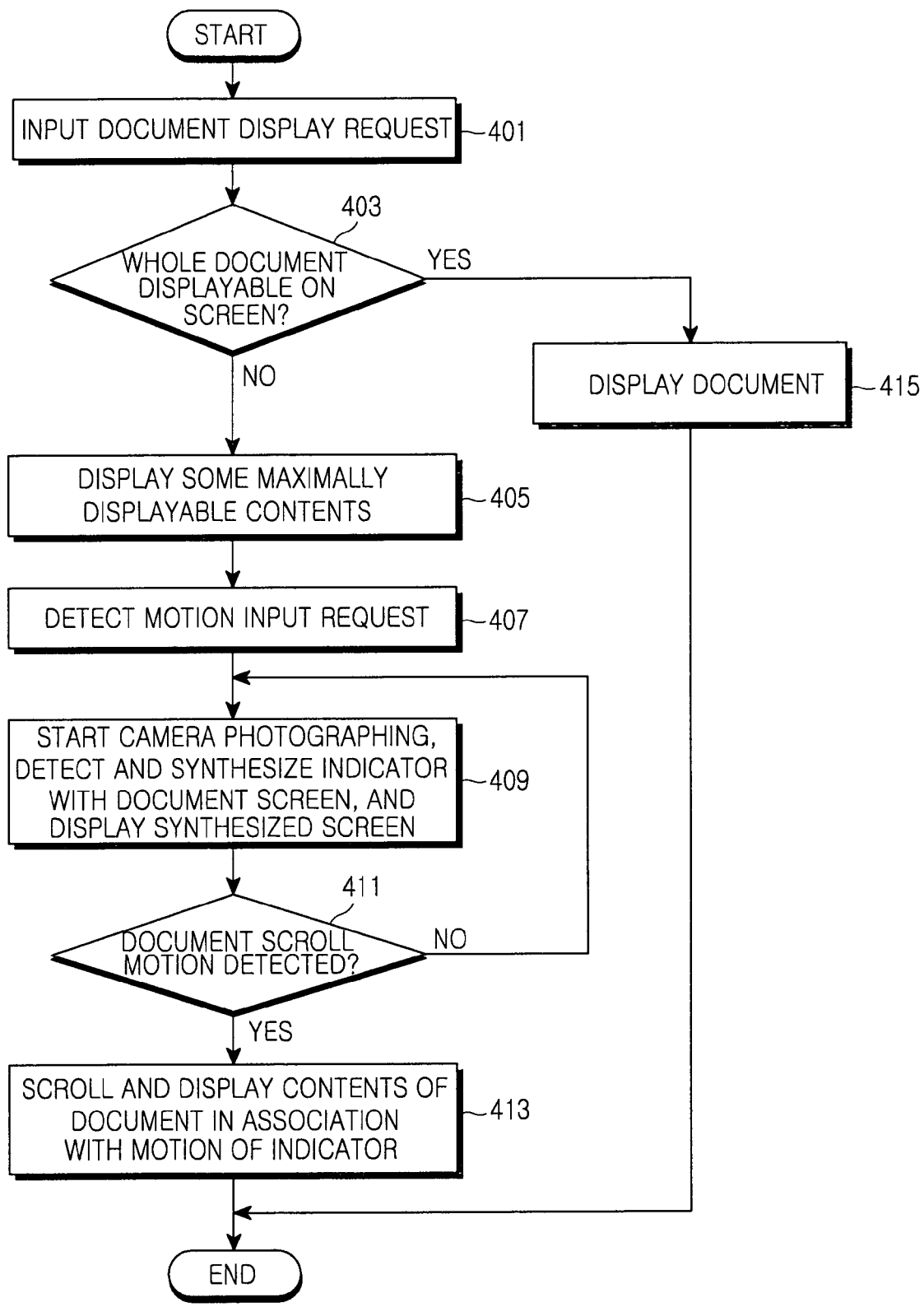
FIG. 5 is a flowchart schematically illustrating an operation of a controller based on document display process according to the present invention.

In the present invention, a process of checking whether a whole document is not displayable on one screen, using a scroll function, will be described with reference to FIG. 5. FIG. 5 is a flowchart schematically illustrating an operation of the controller 11 based on document display process according to the present invention. Referring to FIG. 5, upon receipt of a character display request from the user in Step 401, the controller 11 proceeds with Step 403. In the Step 403, the controller 11 determines whether the whole document can be displayed on the screen. If affirmative, the controller 11 proceeds with Step 415 and displays the entire document on the display screen. Otherwise, it proceeds with Step 405. In the Step 405, the controller 11 displays some maximally displayable contents of the document, and proceeds with Step 407. In the Step 407, upon the detection of the motion input request, the controller 11 proceeds with Step 409. In the Step 409, the controller 11 starts the camera photographing, detects the indicator from the photographed video, real-time synthesizes the detected indicator with a document screen, and displays the synthesized screen. The user desiring to view other parts of the displayed document takes a preset document scroll motion. Upon the detection of the document scroll motion from the photographed video in Step 411, the controller 11 proceeds with Step 413. In the Step 413, the controller 11 scrolls and displays the document content in response to the motion of the indicator, and terminates an operation process. Although not shown, if the user takes a preset scroll unselect motion, the controller 11 changes and displays only the motion of the indicator, and does not scroll and move the document whether the indicator moves in the photographed video. The user can also check a Web Page not displayable on one screen, or the menu screen.

Figure 6:
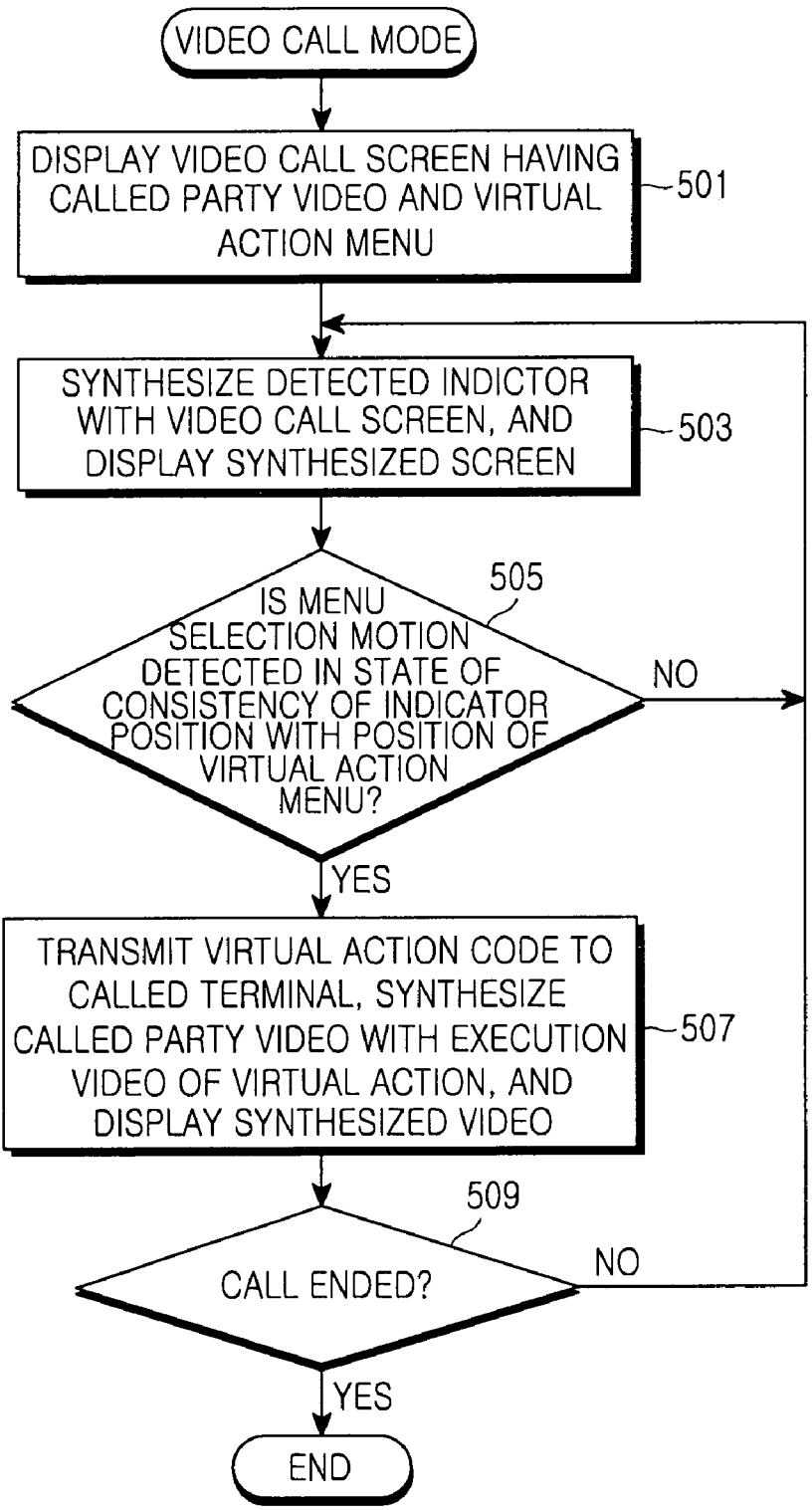
FIG. 6 is a flowchart schematically illustrating an operation of a controller in video call according to the present invention.

Next, a process of performing the virtual action menu, using the AR input mode, during the video call will be described with reference to FIG. 6. FIG. 6 is a flowchart schematically illustrating an operation of the controller 11 in the video call according to the present invention. As shown in FIG. 6, in video call mode, the controller 11 displays a video call screen having called party video/user video and the virtual action menu in Step 501, and proceeds with Step 503. In the Step 503, the controller 11 synthesizes the indicator detected from the photographed video, with the video call screen, displays the synthesized screen, and proceeds with Step 505. The user desiring to execute the virtual action menu for a called party during the video call, checks the screen, moving and positioning the indicator on the desired virtual action menu, and taking the preset selection user's motion. An example of the virtual action menu can be the seeding of the pollen and the setting-off of the firecracker. In the Step 505, in a state where the position of the indicator is consistent with a position of a predetermined virtual action menu of the video screen, upon the detection of the menu selection user motion, the controller 11 proceeds with Step 507. In the Step 507, the controller 11 transmits the virtual action code associated with the selected virtual action menu, to a called terminal, synthesizes the called party video with an execution video of the selected virtual action menu, that is, with a virtual image, displays the synthesized video, and proceeds with Step 509. In other words, the controller 11 transmits only the virtual action code associated with the selected virtual action menu, indirectly transmitting data relating to the selection virtual action menu. The mobile communication terminal receiving the virtual action code detects associated virtual action menu data, synthesizes the detected data with the user's video, and displays the synthesized video.

After that, until the detection of call ends in the Step 509, the controller 11 repeatedly performs the Steps 501 to 507.

The virtual action menu (not shown) can include music play. However, the user inputs a music play command using the AR input mode, while the controller 11 transmits music sound source data included in the image data. The user can select the scroll bar (not shown) representing a temporal music play degree in the music play using the indicator of the AR input mode, as well as adjust the selected scroll bar as desired. The controller 11 plays the music depending on the user's adjustment.

As described above, in the present invention, the preset indicator is detected from the video photographed by the camera in the AR input mode and it is synthesized with the virtual screen constituted of the images associated with the menu or key, stored in the mobile communication terminal. The synthesized screen is displayed, and, in a state where the position of the preset indicator is consistent with the position of the predetermined image on the synthesized screen, upon the detection of the preset user's motion based on the selection, the operation associated with the image is performed, thereby making possible the user's input based on a convenient and interesting method in the mobile communication terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A user input method of a mobile communication terminal, the method comprising:
   displaying a menu screen comprising images associated with each key function and menu function necessary for terminal control, depending on a currently set operation mode;
   detecting a preset indicator using indicator information necessary for distinguishing a variety of indicators from a video that is photographed by a camera when an augmented reality (AR) input mode is set, real-time synthesizing the detected preset indicator with the menu screen, and displaying the synthesized screen; and
   in a state where a predetermined one of the images and the indicator are overlapped on the synthesized screen, upon detection of a preset user's motion associated with selection from the video photographed by the camera, performing an operation based on the function associated with the image.

2. The method of claim 1, wherein the preset indicator is a subject recognized as an input element of the mobile communication terminal, among the video photographed by the camera during execution of the augmented reality input mode.

3. The method of claim 1, wherein the detecting, synthesizing, and displaying step comprises:
   setting the augmented reality input mode in response to user's request, and activating the camera;
   detecting the preset indicator from the video photographed by the camera; and
   real-time synthesizing the detected preset indicator with the menu screen, and displaying the synthesized screen.

4. The method of claim 1, wherein the indicator is set as an indicator that is selected by user from a plurality of previously stored indicators.

5. The method of claim 4, wherein the previously stored indicator comprises one of a user finger, pen, infrared-ray output pen, pupil, and face.

6. The method of claim 1, wherein the user's motion is previously determined in association with a variety of commands that user can input to the mobile communication terminal.

7. The method of claim 1, further comprising, in a state where a scroll bar of the display screen and the indicator are overlapped on the synthesized screen, upon the detection of the preset user's motion associated with selection from the video photographed by the camera, executing a scroll function depending on a motion of the indicator.

8. The method of claim 1, further comprising, in a state where the menu screen is partially displayed, upon detection of a preset scroll user motion from the video photographed by the camera, scrolling and displaying contents on the menu screen in response to a motion of the indicator.

9. A user input method of a mobile communication terminal, the method comprising:
- displaying a character recognition screen, and starting video photographed by a camera provided to the mobile communication terminal;
- detecting a preset indicator using indicator information necessary for distinguishing a variety of indicators from the photographed video, real-time synthesizing the detected preset indicator with a menu screen, and displaying a synthesized screen;
- upon detection of a preset character input starts user's motion from the photographed video, displaying a locus based on a motion of the indicator on the character recognition screen by a line; and
- upon detection of a preset character input end user's motion from the photographed video, stop displaying the locus based on the motion of the indicator, and recognizing the displayed locus as a character.

10. A user input method of a mobile communication terminal, the method comprising:
- in video call, displaying a video call screen comprising a called party's video, a user's photographed video, and a plurality of virtual action menus;
- detecting a preset indicator from the photographed video, real-time synthesizing the detected preset indicator with the video call screen, and displaying the synthesized video call screen; and
- in a state where a predetermined virtual action menu and the indicator are overlapped on the synthesized video call screen, upon detection of a user's selection motion, transmitting an action code associated with the predetermined virtual action menu, to a called party's terminal, synthesizing a virtual image associated with the predetermined virtual action menu, with the called party's video, and displaying the synthesized video.

11. The method of claim 10, further comprising, upon receipt of a predetermined action code from a called party's terminal, searching for a virtual action menu associated with the received action code, synthesizing the virtual image associated with the virtual action menu, with the user video, and displaying the synthesized video.

12. A user input device of a mobile communication terminal, the device comprising:
- a display unit;
- a camera;
- a video processor for real-time matching an indicator detected from a video photographed by the camera using indicator information necessary for distinguishing a variety of indicators, with the photographed video and a virtual video consisting of a previously stored image, correcting an error, and displaying the matched result on the display unit in two or three dimensions; and
- a controller for controlling the video processor and the display unit to display a menu screen having images associated with each key function and menu function necessary for terminal control, on the display unit depending on a currently set operation mode, controlling the video processor in setting of augmented reality input mode to detect a preset indicator from the video photographed by the camera, real-time synthesize the detected indicator with the menu screen, and display the synthesized screen, and in a state where a predetermined one of the images and the indicator are overlapped on the synthesized screen, upon detection of a preset user motion associated with selection from the photographed video, executing an operation based on the function associated with the image.

13. The device of claim 12, wherein the indicator is a subject recognized as an input element of the mobile communication terminal, among the video photographed by the camera during execution of the augmented reality input mode.

14. The device of claim 12, wherein the controller sets the augmented reality input mode in response to user request and activates the camera, and controls the video processor to detect a preset indicator from the video photographed by the camera, real-time synthesize the detected preset indicator with the menu screen, and display the synthesized screen.

15. The device of claim 12, wherein the indicator is set as an indicator that is selected by user from a plurality of previously stored indicators.

16. The device of claim 15, wherein the previously stored indicator comprises one of a user's finger, pen, infrared-ray output pen, pupil, and face.

17. The device of claim 12, wherein the user's motion is previously determined in association with a variety of commands that user can input to the mobile communication terminal.

18. The device of claim 12, wherein, in a state where a scroll bar of the display screen and the indicator are overlapped on the synthesized screen, upon detection of a preset user motion associated with selection from the video photographed by the camera, the controller executes a scroll function depending on a motion of the indicator.

19. The device of claim 12, wherein, when the menu screen is partially displayed, upon detection of a previously determined scroll motion from the video photographed by the camera, the controller scrolls and displays contents on the menu screen in response to the motion of the indicator.

* * * * *